United States Patent [19]
Runyon

[11] 3,916,565
[45] Nov. 4, 1975

[54] ROOTING MATRIX SYSTEM

[75] Inventor: Larry K. Runyon, Kansas City, Mo.

[73] Assignee: Techway, Inc., Hutchinson, Kans.

[22] Filed: Feb. 26, 1973

[21] Appl. No.: 335,592

[52] U.S. Cl. .................. 47/58; 47/1.7; 47/48.5; 61/13; 206/423
[51] Int. Cl.² ................. A01B 79/00; E02B 13/00
[58] Field of Search ............... 47/33, 34, 38, 1.2, 1, 47/27, 58, 48.5, 1 RR, 101.6, 9; 206/65 K, 72, 46 PL, 423; 61/12, 13

[56] References Cited
UNITED STATES PATENTS

| | | | |
|---|---|---|---|
| 585,103 | 6/1897 | Jamison | 61/13 |
| 603,492 | 5/1898 | Waterer | 47/34 X |
| 661,411 | 11/1900 | Lowitz | 47/34 |
| 1,130,203 | 3/1915 | Schreyer | 47/33 X |
| 1,175,102 | 3/1916 | White | 47/34 X |
| 1,401,386 | 12/1921 | Woodberry | 61/13 |
| 1,453,401 | 5/1923 | Mattson | 47/38 |
| 1,570,841 | 1/1926 | Karwatz | 47/34 X |
| 1,924,721 | 8/1933 | Leubuscher | 47/33 X |
| 2,075,590 | 3/1937 | Worth | 47/1 X |
| 2,134,647 | 10/1938 | Savage | 47/34 |
| 2,218,388 | 10/1940 | Twombly | 206/65 K X |
| 2,223,360 | 12/1940 | Ellis | 61/13 X |
| 2,909,328 | 10/1959 | Babyak | 47/48.5 X |
| 2,947,109 | 8/1960 | Davis, Sr. et al. | 47/1 |
| 2,983,076 | 5/1961 | Merrill | 47/1.2 |
| 3,018,586 | 1/1962 | Farley | 47/1.2 |
| 3,037,356 | 6/1962 | Alcoriza | 61/12 |
| 3,154,884 | 11/1964 | Amar et al. | 47/9 X |
| 3,220,194 | 11/1965 | Lieward | 61/13 |
| 3,405,529 | 10/1968 | Hansen et al. | 61/13 X |
| 3,408,818 | 11/1968 | Hemphill | 61/13 |

FOREIGN PATENTS OR APPLICATIONS

| | | | |
|---|---|---|---|
| 352,482 | 7/1931 | United Kingdom | 47/38 |
| 451,449 | 8/1935 | United Kingdom | 47/1.2 |
| 1,023,408 | 3/1966 | United Kingdom | 61/13 |

Primary Examiner—E. H. Eickhold
Attorney, Agent, or Firm—Gregory J. Nelson

[57] ABSTRACT

A method and apparatus for constructing golf greens and tees is disclosed. Modular reservoir units are adaptable for arrangement in an aligned, contiguous relationship to provide a barrier zone containing the growing media. The modules at a common elevation are connected by a common underdrain system of pipe or an integral drain system using special flow connectors. The underdrain system for each elevational level is connected to a discharge having a level control in the form of an adjustable standpipe to control the water level within the system. The method includes installing the modules and underdrain system and filling the modules with an appropriate growing media. Apparatus for selectively controlling the water level in planters and other plant containers is also disclosed.

4 Claims, 16 Drawing Figures

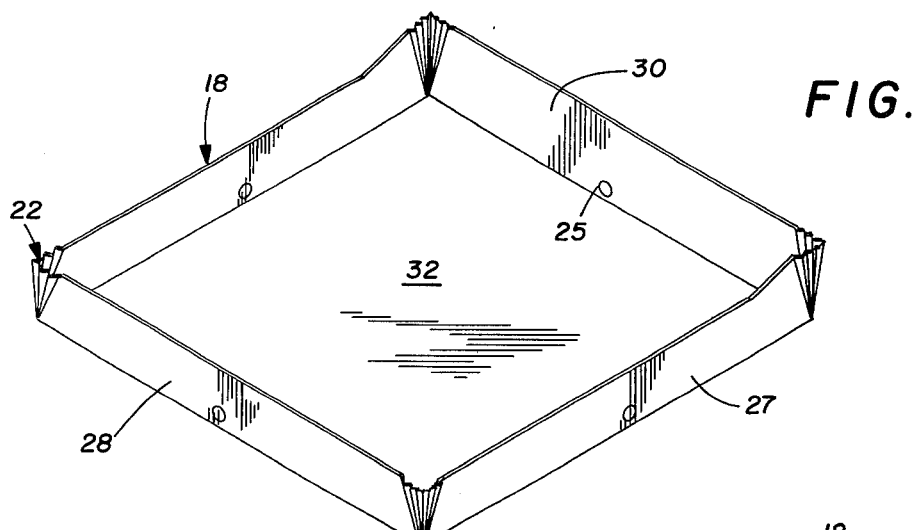
FIG. 5
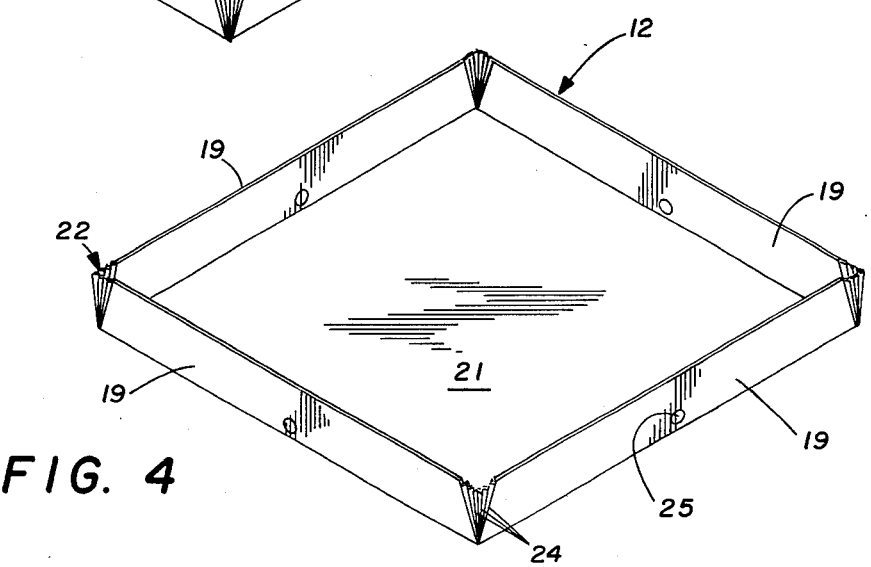
FIG. 4
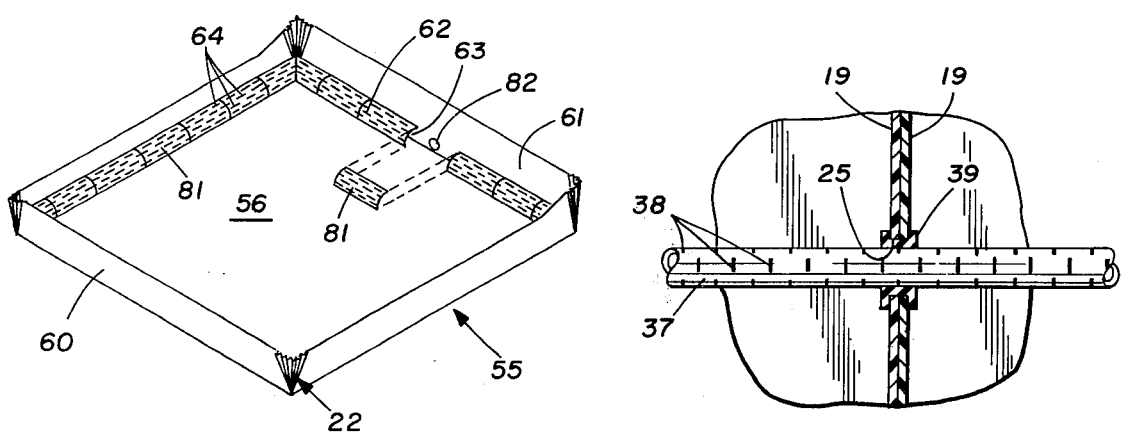
FIG. 6
FIG. 7

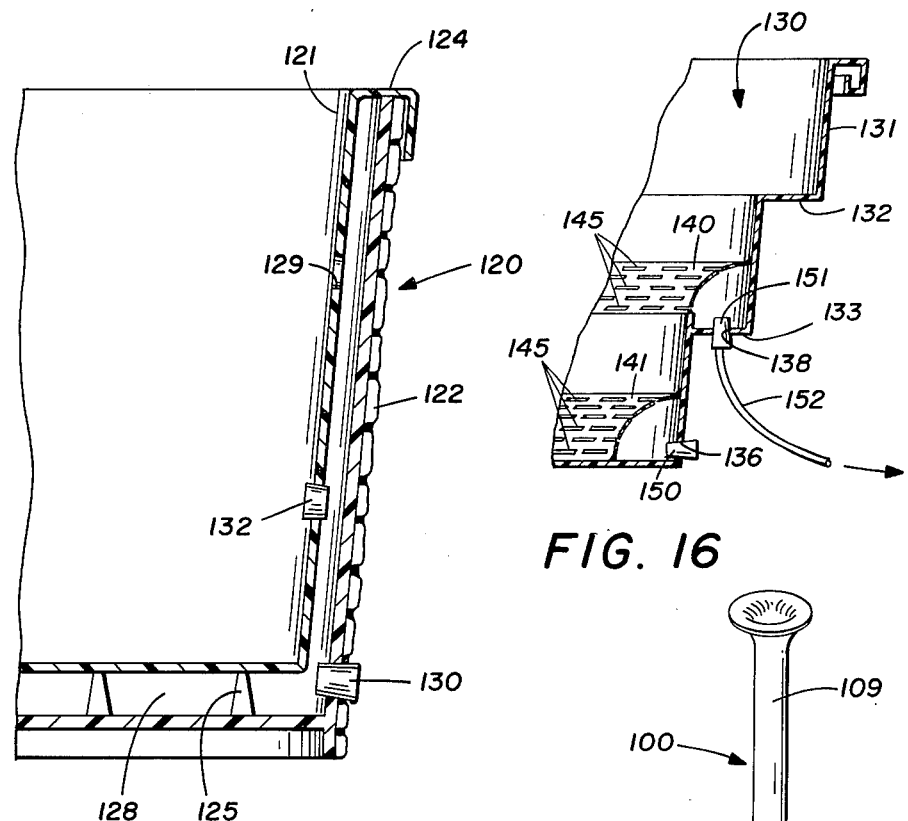
FIG. 15
FIG. 16
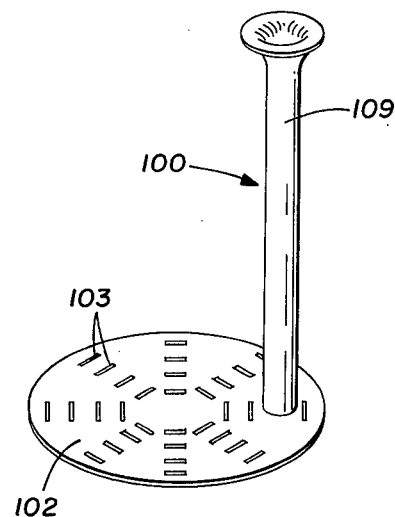
FIG. 14
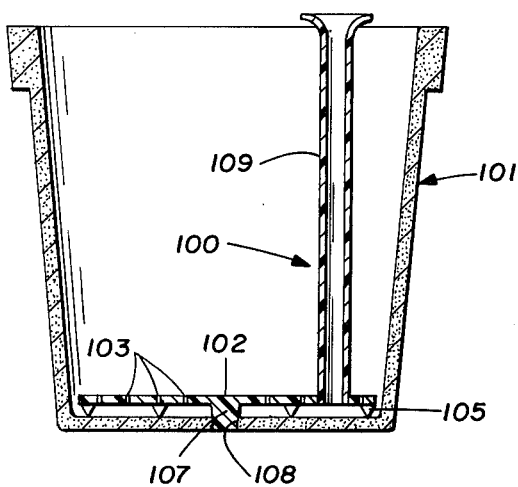
FIG. 13

ROOTING MATRIX SYSTEM

The present invention relates to a rooting matrix system for plant cultivation. More particularly, the present invention relates to a modular system of construction providing an impermeable or barrier zone having controlled drainage containing media to serve as a rooting matrix for plants. The system is especially adapted for the construction of golf greens and tees and in other aspects is adaptable with planters and ordinary plant containers.

The construction on golf greens has in the past been extremely expensive and laborious requiring extensive civil excavation work at the green location. After excavation, proper drainage must be provided by placing various layers of sand and gravel in the excavation. Drainage tiles are also generally installed to carry away excess moisture. The seed bed of the green usually consists of a mixture of calcined clay or similar material, sand and peat moss, along with suitable soil nutrients to provide the rooting matrix for the green turf. The cost of such construction methods is exceedingly high and once the green is installed a number of disadvantages are attendant to conventional golf greens. This construction often results in non-uniform drainage conditions at the various greens of a golf course. One green on a course may permit relatively fast infiltration and drainage of water while other greens, due to clogging of the drainage system, may have water standing on the greens after rains or watering. Thus the management and keeping of greens on a conventional golf course is a very expensive and difficult job requiring a great deal of expertise and professional time.

In attempt to simplify and provide a uniform system of water distribution in the growing of plants and turf, a system called the Purr-Wick root zone system was developed at Purdue University. The Purr-Wick system provides a rooting matrix which uses the large pores of compacted particles, such as sand, above an impervious barrier of polyethylene plastic sheeting. Drainage tubes are placed just above the impervious barrier and are connected to adjustable outlets which re-distribute or conserve or remove water as required. The construction of the Purr-Wick system requires that an excavation be made at the location of the green and that the excavation be properly graded. The plastic barrier is then laid in the excavation and perforated pipe is installed within the reservoir defined by the plastic barrier. Suitable drainage is connected to the perforated pipe. In a green having contours, that is varying elevation across the green surface, barriers or dams must be located at elevational changes. This requires the contractor to form the excavation with a series of internal dams prior to the installation of the polyethylene sheeting. The excavation is then back filled with the proper media and the apron and collar areas are graded. While this system represented a marked improvement over the conventional construction of golf greens, it nevertheless requires substantial excavation. Further the workers installing such a system must be skillful and fully advised and trained in the proper location and construction of the interior dams.

The system of the present invention represents an improvement over the Purr-Wick system of construction discussed above. The system provides an apparatus and method which utilizes a number of individual modules of an impervious material such as a plastic which may be located in adjacent, contiguous alignment to provide the impervious reservoir to contain the compacted plant media. The modules can be arranged in any configuration and the walls of the modules serve as interior dams or barriers at contour changes in the green. The modules are arranged at the desired location, after a minimum of preparatory grading, are interconnected by a drainage system, and connected to a service pit. The drainage system may be in the form of perforated pipe or is preferably integral in the modules adapted for convenient connection to selected adjacent modules. An adjustable standpipe level control at the service pit controls the level of moisture within commonly connected modules to remove or conserve water as required. The modules are preferably configured having accordion-like corner sections to facilitate installation of the modules and also include removable, knockout sections to permit easy connection of the drainage system.

In another aspect of the present invention, rooting barrier units are disclosed which are cooperable with conventional growing trays, flower boxes and flower pots.

Other features and advantages of the present invention will become more apparent from the following specification, claims and drawings in which:

FIG. 4 is a perspective view of an individual module;

FIG. 5 is a perspective view showing another form of module;

FIG. 6 shows still another form of the module incorporating an integral drainage system;

FIG. 7 is an enlarged detail view showing one form of the interconnection between adjacent modules;

FIG. 13 is a cross-sectional view of an insert adapted for cooperation with a standard flower pot;

FIG. 14 is a perspective view of the insert shown in FIG. 13;

FIG. 15 is a partial sectional view showing another embodiment of the present invention adapted as a planter; and FIG. 16 shows still another embodiment of the present invention.

Figure 1:
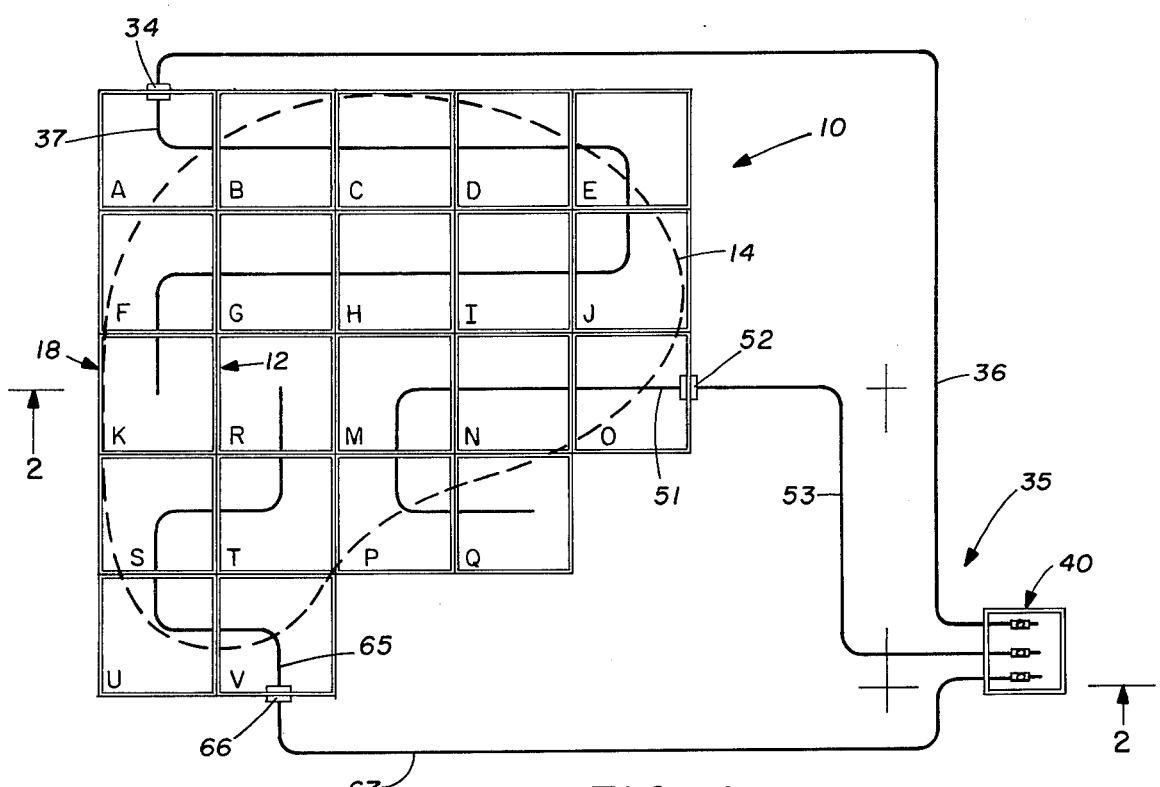
FIG. 1 is a plan view, partly in schematic, of the modular green assembly of the present invention.
Figure 2:
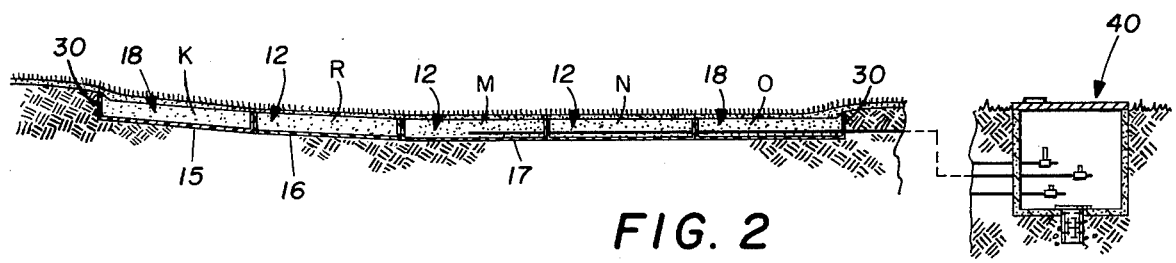
FIG. 2 is a cross-sectional view taken along lines 2—2 of FIG. 1 showing the green construction in greater detail.

Referring now to the drawings, particularly FIGS. 1 to 10, the system of the present invention is generally designated by the numeral 10 and includes a number of individual generally rectangular modules designated by the numbers 12 and 18. As seen in FIG. 1 the individual modules 12 and 18 are adapted to be placed in contiguous, aligned relationship in a grid-like system arrangement with the individual modules 12 and 18 occupying locations A, B, C, etc., of the grid to form a green of a shape shown in dotted lines and generally designated 14. The grade as best seen in FIG. 2, has been sloped from left to right, having three general elevational levels 15, 16 and 17. When the individual modules 12 and 18 are arranged in contiguous alignment as seen in FIG. 1, a pattern is disclosed so that modules in grid locations A through K occupy a position at elevation 15. Modules at locations designated M through Q occupy a position on intermediate elevation 16 and the remaining module locations designated R through V are at the lowest elevation in the arrangement.

The construction of individual modules is best seen in FIGS. 4 and 5. The module 12 of FIG. 4 is generally rectangular having upstanding sidewalls 19 and generally rectangular having upstanding sidewalls 19 and generally flat bottom portion 21. The corners 22 between intersecting sidewalls 19 are formed having an expandable section made up of a series of fold lines 24 diverging from the bottom corner upwardly. This corner construction gives the module sidewalls 19 an expandable capability so that the units can easily be aligned with adjacent sidewalls abutting to maintain the integrity required for proper alignment and drainage. Panels 25 in sidewalls 19 have reduced thickness and serve as knockout sections easily removable by breaking with a suitable tool. Panels 25 may be provided at one or more locations in each sidewall. The modules 12 may come in varying sizes, however, typically would be no larger than ten feet on each side and would have an approximate wall height of one foot consistent with conventional shipping limitations. Preferably the material of construction is a lightweight resistant plastic such as polyvinylchloride or a reinforced fiber glass structure. The module of the type shown in FIG. 4 is adapted for installation in the interior of a system.

FIG. 5 shows a modification of the module, designated 18, adapted for use around the periphery of the system at a location in the grid. As for example, the modules at the locations designated K and O in FIG. 2 would be of this construction. As seen in FIG. 5, module 18 is formed having adjacent intersecting sidewalls 27 and 28 of equal height. One or more adjacent sidewalls 30 are of greater height than adjacent sidewalls 27 and 28. A corner module would, for example, have two adjacent walls 30 of increased height. A generally flat bottom member 32 completes the module 18. The increased height of wall 30 serves to provide an exterior barrier around the periphery of the green. The corners of module section 18 are formed similar to those of module 12, having expandable sections 22 to accommodate installation of the system and facilitate abutting engagement of adjacent sidewalls of adjacent boxes when slight variations in contour and ground evenness exists. Knockout panels 25 are also provided in spaced locations in the side and end walls.

Drainage from the modules located at a common elevation is by means of an underdrain system generally designated by the numeral 35. The underdrain system of FIG. 1 comprises a drain line 36 extending from service pit 40 to connect with the module at A at coupling 34. Modules at locations A through K are interconnected by means of a perforated plastic pipe 37 extending from one sidewall of the module at A and terminating within the module at location K. As best seen in FIG. 7, which is representative of the various underdrain systems, pipe 37 has perforations or slits 38 provided along the pipe. Panels 25 at adjacent module walls 19 are removed to accommodate insertion of underdrain pipe 37. The annular area around the underdrain pipe 37 at the module sidewalls 19 is sealed by placement of a suitable resilient, annular sealing ring 39 to prevent leakage of water from the modules at this point. The outer end of underdrain pipe 37 is coupled at 34 to imperforate drain line 36 which terminates end service pit 40.

Figure 3:
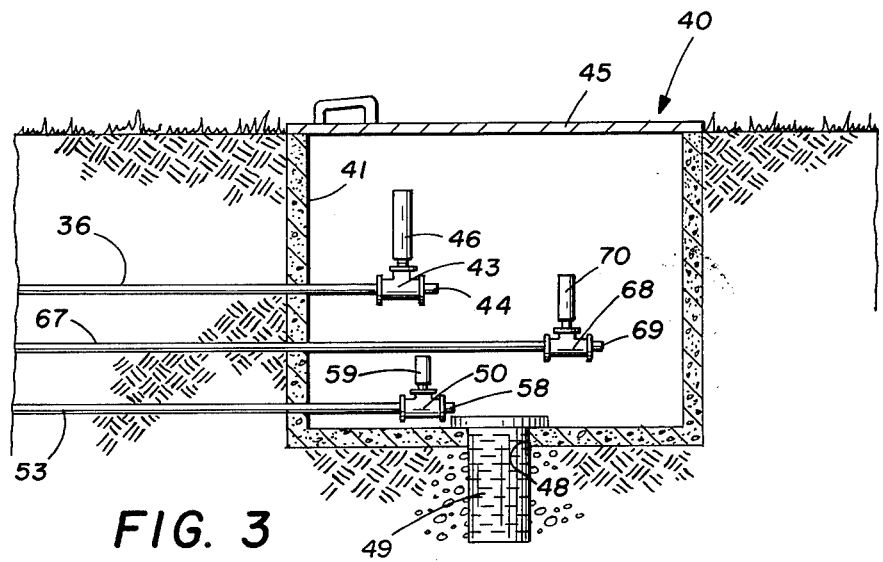
FIG. 3 is an enlarged view of the service pit shown in FIG. 2.

Service pit 40, best seen in FIG. 3, is formed with a rectangular concrete or plastic lining 41 enclosed by cover 45. Opening 48 receives drain pipe 49 which serves as a sump or drain and carries away water discharged into service pit 40. Pipe 36 enters service pit 40 at an elevation approximately corresponding to the elevation of the location of the connection 34 of pipe 36 to underdrain system 37. The terminal end of discharge line 36 is provided with the tee connection 43 having one outlet plugged at 44. An adjustable vertical riser or standpipe 46 is connected at the other outlet of tee 43. The vertical height of standpipe 46 controls the elevation or level of water in the portion of the green formed by modules at locations A through K. Varying the standpipe will accordingly control the level within the common reservoir formed by the modules at A through K.

Modules at locations M through Q are arranged at lowest elevation 17. These modules are arranged in abutting relationship having a common perforated underdrain pipe 51 extending through the modules at the knockout panels and sealed at the juncture by rings 39. Pipe 51 terminates at connection 52 which couples drainage pipe 53 to the internal underdrain system. Underdrain 51 is perforated to accommodate drainage. The terminal end of discharge pipe 53 is located at an elevation corresponding to the elevation of underdrain pipe 51 in service pit 40. Tee 50 is affixed to the end of discharge pipe 53 having one outlet plugged at 58 and having vertical riser member 59 provided in the other outlet. The height of vertical riser member 59 controls the level of water within the portion of the system formed by the modules at grid locations M through Q.

Remaining module sections located at R through V form the intermediate elevational portion of green 14 at grade level 16. Perforated underdrain pipe 65 commonly extends through these modules and is connected at coupling 66 to discharge pipe 67 which terminates in the service pit area 40. The terminal end of discharge pipe 67 is similarly fitted with the tee 68 having a drain plug 69 in one outlet and riser or standpipe 70 vertically extending from the other outlet. As in the case of the low and high level drainage systems, the height of the standpipe controls the level of the liquid reservoir within the underdrain system defined by modules at locations R through V.

In addition to use of perforated pipe interconnecting modules, other forms of the common underdrain system may be provided for the module sections. FIGS. 6 and 8 to 11 illustrate a modified form of underdrain. FIG. 6 shows a module 55 having a generally rectangular shape with bottom 56 and upstanding sidewalls 60 and 61. The module corners are provided with expandable sections 22 and one or more sidewalls 61 may be of increased height for peripheral placement in the green system.

The integral underdrain includes a continuous semi-circular wall member 62 extending between sidewalls 60 and 61 and bottom 56 forming a peripheral channel 63. Wall member 62 is perforated having small slits or opening 64 to communicate with channel 63. Removable sections 81 are provided at spaced locations in wall 62. A knockout panel 82 in the module walls aligns with removable sections 81.

Figure 8:
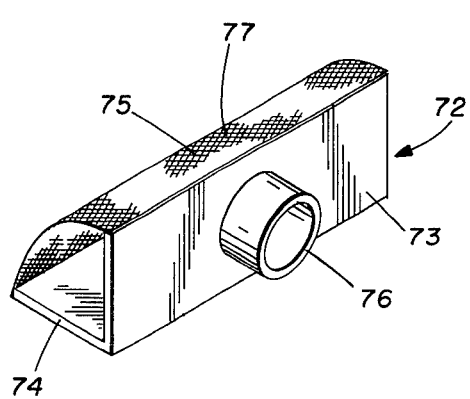
FIG. 8 is a perspective view of a module connector.

Module underdrain connector 75 is adapted for use with module 55 as shown in FIG. 8 and is formed having sidewall 73 and bottom wall 74 generally arranged in a right angle configuration. Semi-circular wall 75 extends between members 73 and 74. Wall 75 is formed with a number of small apertures 77 to permit infiltration of water while keeping out sand, dirt and other debris. Wall 75 is shown as screen but openings 77 could similarly be slits of about 0.020 inches in width. Discharge pipe 76 extends horizontally from face 73 of module 72.

Figure 10:
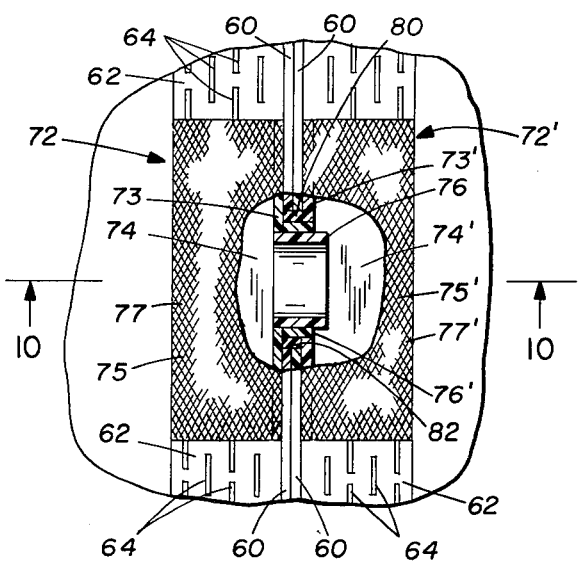
FIG. 10 is a cross-sectional view taken along lines 10—10 of FIG. 9.
Figure 9:
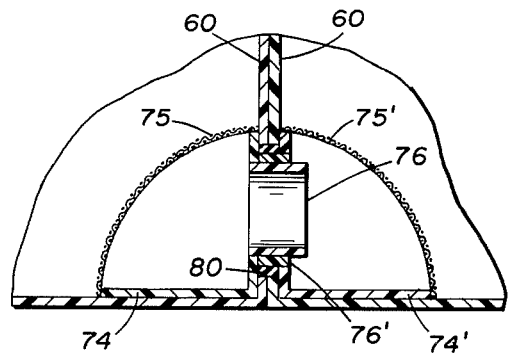
FIG. 9 is a plan view of an installed connector as seen in FIG. 6.

As seen in FIGS. 9 and 10, the connectors 75 are adapted for assembly with modules 55 to form a hydraulically interconnected underdrain. The modules 55 are arranged in aligned, contiguous relationship with sidewalls 60 of adjacent modules abutting. Selected sections 81 are removed from the modules. Connector 72' is adapted to connect to one module 55 and is similar in construction of connector 72 but is provided with a discharge pipe 76' having an interior diameter corresponding to the exterior diameter of pipe 76. In this way pipe 76 can be inserted into pipe 76' so that the interior of the connecting modules are in hydraulic communication via the connector. Opening 82 in adjacent module sidewalls is removed by workmen at the time of installation. The connectors are placed having sides 73 and 73' against the interior sidewalls of the respective module, as for example sidewall 60 of the modules. Connector pipes extend horizontally through the adjacent openings with the discharge pipe 76 and 76' inserted one inside the other to provide a leak-proof connection. A suitable annular seal 80 is inserted in the sidewalls opening to prevent fluid leakage. Multiple connectors may be provided between adjacent modules to provide for better flow-through capability. Thus with the modified module construction having the integral channel and utilizing the prefabricated connectors, a common underdrain system can be quickly and easily installed without difficult pipe connections. Obviously almost any configuration is available to the green architect.

The system of the present invention as applied to the construction of greens will be better understood from the following description of the method of installation of the modular root zone system for turf. To construct a golf green using the modules of the present invention the contractor first determines the size, location and contour of the green desired. With the versatile system any shape and size may be selected. The green would be laid out roughly in a grid system as shown in FIG. 1 and the contractor would proceed to grade the area providing the contour desired. It will be noted that if a one level or flat green is desired, little or no grading will have to be done since the system is adaptable to use on uneven ground. It is not necessary to do extensive excavation to form a deep pit for installation of various layers of sand and gravel as was necessary with conventional green building techniques. Once the minimum amount of grading has been done the individual modules 12 can be placed in location. At peripheral locations in the grid where increased wall height is needed, modules of the type designated by the numeral 18 are positioned with walls 30 defining the grid periphery. The modules at a common elevation are interconnected by a common underdrain pipe system and connected by a pipe to a service pit 40 which has been constructed as seen in FIG. 3. The discharge pipes are provided with the tee connection and riser pipe. The modules can then be back filled with an appropriate growing media, usually about 12" of sand and a top dressing of peat moss, clay and soil nutrients. The apron or collar areas are similarly filled and graded and the green is ready for seeding. During wet seasons water can be removed from the reservoir defined by the modules at discharge risers, adjusting them as required. Similarly in dry weather, water can be conserved by adjusting the outlets. The system permits fast infiltration and re-distribution of water to maintain the desired, uniform growing conditions. The same system can be effectively used for cultivation of tee areas.

The green can similarly be constructed using modules 55. With these modules construction of the internal underdrain is simplified as adjacent modules are placed in hydraulic communication by removal of adjacent knockout panels 82 and insertion and connection of connector units 75. The external connection to the service pit is completed and the modules filled with growing media as described above.

Figure 11:
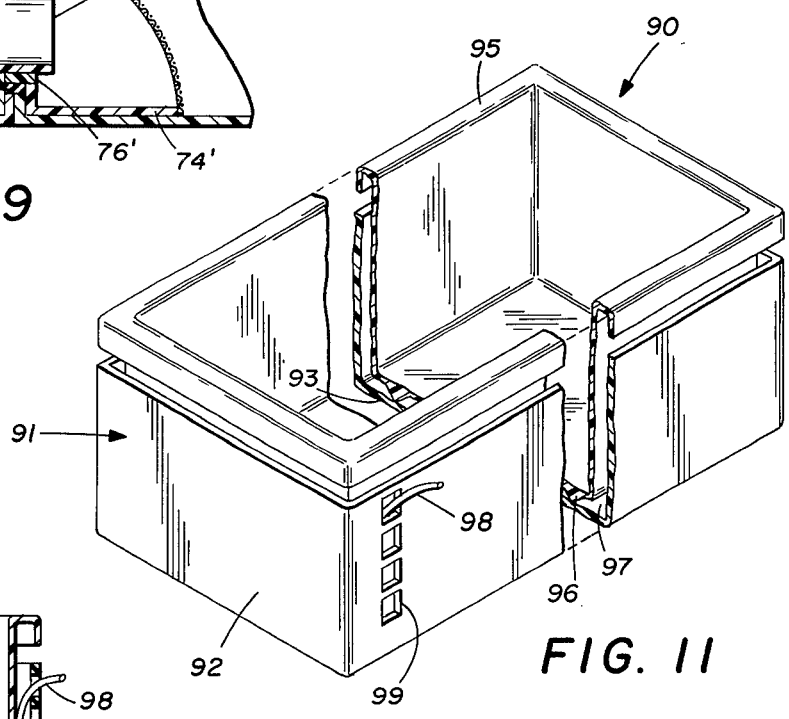
FIG. 11 is a perspective view showing the modular concept as applied to a planter.
Figure 12:
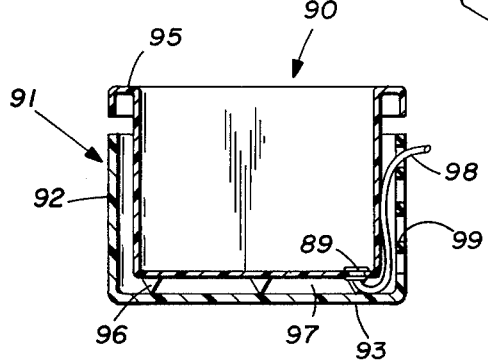
FIG. 12 is a cross-sectional view of the embodiment of FIG. 11.

FIGS. 11 and 12 show the modular concept for selective water control as applied to a garden planter. This embodiment is generally designated by the numeral 90 and includes an exterior housing member 91 which may be generally rectangular or square. Housing 91 has generally vertical sidewalls 92 and a bottom 93. An interior liner 95 corresponding in shape to housing 91, is received with housing 91 supported at bottom 93 on channels 96 to define a bottom compartment 97. Discharge hose 98 connects to the bottom of liner 95 at fitting 89. Hose 98 leads through compartment 97 to the exterior through one or more openings 99 to permit drainage from liner 95. The interior compartment area defined by the liner 95 is appropriately filled with a media for plants such as sand, clay or peat moss. When the plants are watered, the level of moisture in the bottom of the liner will not exceed the elevation of discharge hose 98 as excess moisture will drain off via hose 98. If desired, the water level in the planter can be varied by relocating the end of hose 98 in a notch 99 at a different elevation. In this way, an adequate predetermined reserve of water can be maintained in the bottom of the planter at all times. Ideally the entire unit including the housing 91 and interior liner 95 will be formed of a suitable material such as a plastic. If desired, a suitable exterior treatment or facing such as simulated brick can be placed upon the unit to give the planter a pleasing, aesthetic appearance. The liner insert designated 95 may be provided as a separate unit for installation in existing planter units.

The concept of a modular or integral unit for controlling watering conditions is also adaptable for use with a standard conventional flower pot. As seen in FIGS. 13 and 14 flower pot 101 is provided with an insert or liner member 100. Liner member 100 has a circular floor portion 102 roughly corresponding to the bottom diameter of the flower pot. Floor member 102 is provided with a plurality of perforations 103 preferably in the form of small slits. Legs 105 support floor 102 in the bottom of the flower pot. A plug 107 is fixed to the underside of floor 102 and is adapted for insertion in the center hole 108 conventionally found in the bottom of most flower pots. A vertical riser or inspection tube 109 extends from floor 112 to approximately the elevation of the size of the flower pot. The inspection tube allows the user to slowly water the plant contained within the pot and observe the water level within the inspection tube which corresponds to the water level within the pot. In this embodiment no automatic discharge is provided but rather a visual check is relied upon to determine with accuracy the precise water level within the pot.

FIG. 15 shows still another embodiment of the present invention designated 120. Liner 121 is supported in planter 122 at lip 124 and on bottom channel 125. A reservoir 128 is defined between the bottom of liner 121 and planter 122. One or more discharge orifices 129 are provided in the liner sidewall. Discharge opening 130, preferably plugged for periodic drainage, opens into reservoir 128. Excess moisture, above the level of orifice 129, will be discharged into reservoir 128 for removal at opening 130. The desired water level can be varied by selectively placing plug 132 in one of the multiple orifices 129.

FIG. 16 shows still another embodiment of the rooting system of the present invention using a modular rooting matrix container with adjustable water level control. In FIG. 16 planting container 130 adapted for reception of a plant growing media is provided having a vertical wall 131 formed with a series of tiers 132 and 133. A drain hole 136 is provided near the bottom of container 130. Another drain hole 138 is provided in the horizontal section of tier 133. A pair of perforated covers or baffles 140 and 141 extend in the container interior to house the drain hole in the channel formed by the covers. Baffles 140 and 141 are perforated with small slits 145 to permit passage of water. Drain hole 136 is plugged by stopper 150. A fitting 151 including a drain hose 152 is inserted in hole 138 to carry away excess moisture above the level of hole 138. Hose 152 is placed to lead to an appropriate floor drain or the like. To lower the acceptable water level in the planting container, the stopper and drain fitting are reversed.

The present invention thus provides a unique approach to the construction of golf greens and a unique concept as applied to a wide variety of containers for plant cultivation. It will be obvious to those skilled in the art to make various changes, modifications and alterations, to the construction shown. It is intended that such changes are within the scope of the present invention and that the present invention be limited only by a fair interpretation of the appended claims.

What is claimed is:

1. A method for controlling water drainage from a golf green having a plurality of discrete surface areas of varying elevation to selectively provide for control of drainage of water applied to said surface areas, thereby promoting optimum and substantially uniform overall surface conditions of said golf green, said method comprising:
   1. placing generally beneath each of said discrete areas a subsurface moisture barrier adapted to prevent surface water applied to the surface of each said area from draining to a level below the barrier provided for said area;
   2. interconnecting at least some of said moisture barriers of the same general subsurface elevation with a common underground drainage conduit system adapted to drain surface water collected in the respective moisture barriers thereof; and
   3. connecting each of said drainage conduit systems with level control means for maintaining the water level in each of said moisture barriers at a preselected level, thereby promoting said optimum and substantially uniform golf green surface conditions.

2. A method for controlling water drainage from a golf green having a plurality of discrete surface areas of varying elevation to selectively provide for control of drainage of water applied to said surface areas, thereby promoting optimum and substantially uniform overall surface conditions of said golf green, said method comprising:
   1. placing generally beneath each of said discrete areas a subsurface moisture barrier comprised of a plurality of impermeable housings having upstanding sidewalls and arranged in contiguous relationship, said moisture barriers adapted to prevent surface water applied to the surface of each of said area from draining to a level below the barrier provided for said area;
   2. interconnecting at least some of the housings forming the moisture barrier of the same general subsurface elevation with a common underground drainage conduit system adapted to drain surface water collected in the respective moisture barriers thereof; and
   3. connecting each of said drainage conduit systems with level control means for maintaining the water level in each of said moisture barriers at a preselected level, thereby promoting said optimum and substantially uniform golf green surface conditions.

3. A rooting matrix system comprising:
   1. a first plurality of prefabricated impermeable module units arranged in aligned, contiguous relationship at a first higher elevation;
   2. a second plurality of prefabricated impermeable module units arranged in aligned, contiguous relationship at a second lower elevation;
   3. said first and second modules having expandable sections to accommodate alignment and further wherein the modules occupying peripheral locations in the module arrangement have an exterior sidewall of increased height defining the periphery of the arrangement;
   4. a first common underdrain system interconnecting said first plurality of modules;
   5. a second common underdrain system interconnecting said second plurality of modules;
   6. first discharge pipe means connected to said first underdrain system;
   7. second discharge pipe means connected to said second underdrain system; and
   8. a service pit area housing stand pipe means associated with said first and second discharge pipe adapted to control the water level in said first and second module units.

4. A rooting matrix system comprising:
   1. a plurality of prefabricated housings arranged in contiguous relationship;
   2. said housings having:
      a. an impermeable bottom and upstanding sidewalls,
      b. perforated baffle means extending in said housing and defining a channel with said housing bottom and at least one sidewall; and
      c. a removable panel section in said one sidewall within said channel;
   3. connector means adapted to be received in said removable baffle sections and cooperable to establish hydraulic communication between selected adjacent housings.

* * * * *